US008689681B1

(12) United States Patent
Nozadze

(10) Patent No.: US 8,689,681 B1
(45) Date of Patent: Apr. 8, 2014

(54) "VALDON"—A DUAL-PURPOSE BREAD BAKING OVEN

(71) Applicant: Vladimir Nozadze, Brooklyn, NY (US)

(72) Inventor: Vladimir Nozadze, Brooklyn, NY (US)

(*) Notice: Subject to any disclaimer, the term of this patent is extended or adjusted under 35 U.S.C. 154(b) by 0 days.

(21) Appl. No.: 13/946,565

(22) Filed: Jul. 19, 2013

(51) Int. Cl.
A47J 37/04 (2006.01)

(52) U.S. Cl.
USPC .......................................... 99/443 R

(58) Field of Classification Search
USPC ......... 99/441, 443 R, 479; 108/151; 426/243, 426/95, 502, 302
See application file for complete search history.

(56) References Cited

U.S. PATENT DOCUMENTS

| 2,251,600 | A | * | 8/1941 | Pollock | 108/59 |
| 3,425,364 | A | * | 2/1969 | Martin, Jr. | 432/65 |
| 5,906,855 | A | * | 5/1999 | Persson et al. | 426/523 |
| 6,477,966 | B1 | * | 11/2002 | Petryna | 108/11 |
| 6,706,301 | B2 | | 3/2004 | Vaughan | |
| 7,140,362 | B1 | * | 11/2006 | Johnston | 126/25 A |
| 2012/0189743 | A1 | | 7/2012 | Ajmera | |

FOREIGN PATENT DOCUMENTS

| GB | 2431566 | 5/2007 |
| RU | 2460945 | 9/2012 |

* cited by examiner

Primary Examiner — Dana Ross
Assistant Examiner — Renee L Miller
(74) Attorney, Agent, or Firm — Boris Leschinsky

(57) ABSTRACT

A dual-purpose urn-shaped clay oven is traditionally configured for baking flatbread on the inner sidewalls thereof. To increase its utility in a commercial bakery, a removable tray system is provided allowing using the oven for baking conventional bread products. The tray system includes a number of frame segments extending radially from a common vertical axis and rotatably supported below the oven cover. The oven cover has a door to partially access the oven and allow rising of one frame segment at a time from the oven to replace the bread products with unbaked dough. Each frame segment supports a number of vertically stacked baking trays configured for holding bread while baking. Also described is a conversion kit to adapt an existing oven for dual-purpose use.

8 Claims, 10 Drawing Sheets

"VALDON"—A DUAL-PURPOSE BREAD BAKING OVEN

BACKGROUND OF THE INVENTION

The present invention relates generally to ovens for baking bread. More particularly, the invention describes an urn-shaped traditional clay oven configured for baking flatbreads on the walls thereof, which is adapted to allow baking bread on the removable plurality of baking trays positioned in the center portion of the oven.

Generally, oval urn-shaped clay ovens have been used for centuries in Asia and on the Indian sub-continent. A vessel of the urn-shaped oven is typically made from earthen ware or fired clay, and has a heat source generally made by burning wood or from charcoal located at the bottom of the vessel. Modem ovens of this type have been adapted to run on a gas supply and so subsequent problems of ash fall out and mess have been avoided—see FIG. 1. As the oven heats up, it becomes a thermal mass and so cooks the food by convection, conduction, and radiation.

Flatbreads such as a Georgian flat bread ("kartuli puri"), Indian flat bread (naan), chapattis and others are baked by being placed on the internal side walls of the oven and are evenly cooked on both surfaces at the same time. This wrap around heat ensures a fast response in baking the flatbread. Because of the oven's innate process of cooking, western style conventional ovens are rendered unsuitable. By virtue of their size, cost and weight these conventional ovens are generally restricted to industrial and commercial operations.

Flatbreads are traditionally made in the Caucuses, Central and South Asia, India and now enjoyed worldwide, especially as an accompaniment to traditional ethnic foods. It is generally made from leavened dough that is flattened and baked in an urn-shaped oven, referred to by various names such as tone or tandoor.

A traditional oven consisted of an oval clay baking layer encased in a masonry or earth housing. An insulating layer of sand may be provided between the clay layer and the housing. The oven may be heated by charcoal or wood burned in the bottom of the baking chamber. Also provided is a cover for the top opening of the oven, which is generally smaller than the largest internal diameter of the oven. The generally oval shape of the vertical cross-section of the oven is critical for proper baking as it causes reflections of radiating heat and assures even baking on both sides of the flatbread.

To bake flatbreads in a traditional oven, pieces of flattened dough are slapped by hand or a baking pad onto an extremely hot interior wall of the oven. A hook may be used to remove the baked bread after a short baking time.

The basic process for baking flatbreads has not changed for centuries. Modern oval ovens use different materials (such as steel housings and ceramic interiors) and different heating options (such as electric heating elements or gas burners). However, the basic shape of the oven, and the vertical wall-based baking process have not changed.

Despite the popularity of flatbreads, a traditional oven design described above has a number of drawbacks—in terms of productivity, material issues and poor safety.

A traditional flatbread must be baked at very high temperatures to impart the sultry smoky characteristic that is its signature. Clay ovens, in particular, are known to crack under prolonged exposure to high heat. Cracks can cause the traditional sand fill that is used to insulate the oven to leak into the baking chamber, potentially getting into the food. It is seldom possible to effectively patch a clay oven once it cracks. Accordingly, it becomes necessary at regular intervals to replace the entire oven.

Traditional baking methods are also dangerous even for skilled operators. The inside of the oven reaches temperatures often in excess of 700° F. In order to slap the raw bread dough onto the inside walls of the oven, the operator must stick a portion of his arm into the oven. Any slight contact with the walls of the oven can result in severe burns. The top openings of the oven are often relatively small (as small as 1-2 ft across in some cases), increasing the difficulty to maneuver the bread into place without contacting the hot oven surfaces.

In a traditional oven, a baker can only bake a small number of flatbread at a time due to the small size of most ovens and due to the quick baking process requiring constant human involvement and attention. Consequently, an operator bakes a steady stream of tiny batches of breads for immediate serving and consumption. For the purposes of a commercial bakery, it is desirable to have an oven that can be utilized for the purposes of baking a traditional flatbread as well as other bread products which are baked using conventional ovens.

The need therefore exists for an oven that can be configured for both purposes: baking flatbreads on its oval sidewalls as well as baking conventional breads and bread products on regular trays as done in a modern bakery. The need also exists for a conversion kit to adapt a traditional flatbread producing urn-shaped oven to baking regular bread and bread products.

SUMMARY OF THE INVENTION

Accordingly, it is an object of the present invention to overcome these and other drawbacks of the prior art by providing a novel oven supplied with a removable circular tray system configured to allow baking of conventional bread products when inside the oven while allowing for baking flatbreads on the interior sidewall of the oven when the tray system is removed therefrom.

It is another object of the present invention to provide a kit for converting a traditional oval oven adapted for baking flatbreads on the interior sidewalls thereof for a second purpose of baking conventional bread products in the central portion thereof.

The oven of the present invention may be constructed as a traditional oven described above. Its clay- or ceramic-covered interior sidewall may be configured to allow baking of flatbread thereon. Also provided (or supplied as a separate conversion kit) is a removable tray system including a plurality (such as three in one embodiment) of individually removable frame segments assembled on a supporting mechanism around a common vertical axis so as to form a generally circular shape of the tray system. The supporting mechanism and the frame segments are positioned in the oven with the help of the oven cover retaining the tray system in place. Baking trays may be vertically stacked up on each frame segment. The supporting mechanism allows rotation of the tray system while in the oven so that frame segments may be individually pulled out of the oven one at a time.

In use, the oven may be used in one of two ways: flatbreads may be baked on the interior sidewalls when the tray system is removed from the oven. After positioning the tray system in the oven, conventional baking may commence using removable baking trays. Individual removal of each frame segment allows replacing of the baking trays with baked bread products for new baking trays with unbaked dough. After positioning of the frame segment, the tray system may be rotated and another frame segment may be raised or removed for exchanging trays. The baking process may be organized by periodically rotating the circular tray system and replacing the baked bread products for unbaked dough in one frame segment while all other frame segments are maintained inside the oven to bake the dough positioned on these other frame segments.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF THE FIRST PREFERRED EMBODIMENT OF THE INVENTION

Figure 1:
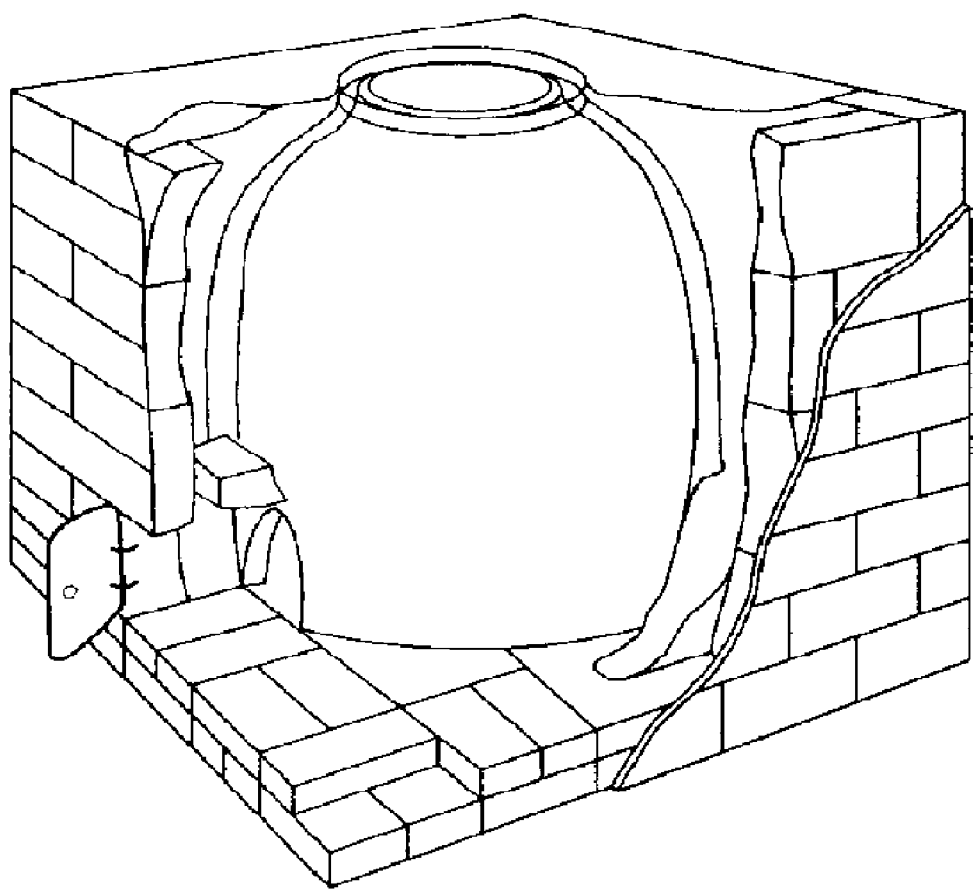
FIG. 1 is a partial cut-out perspective view of the prior art traditional clay ovens.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 2:
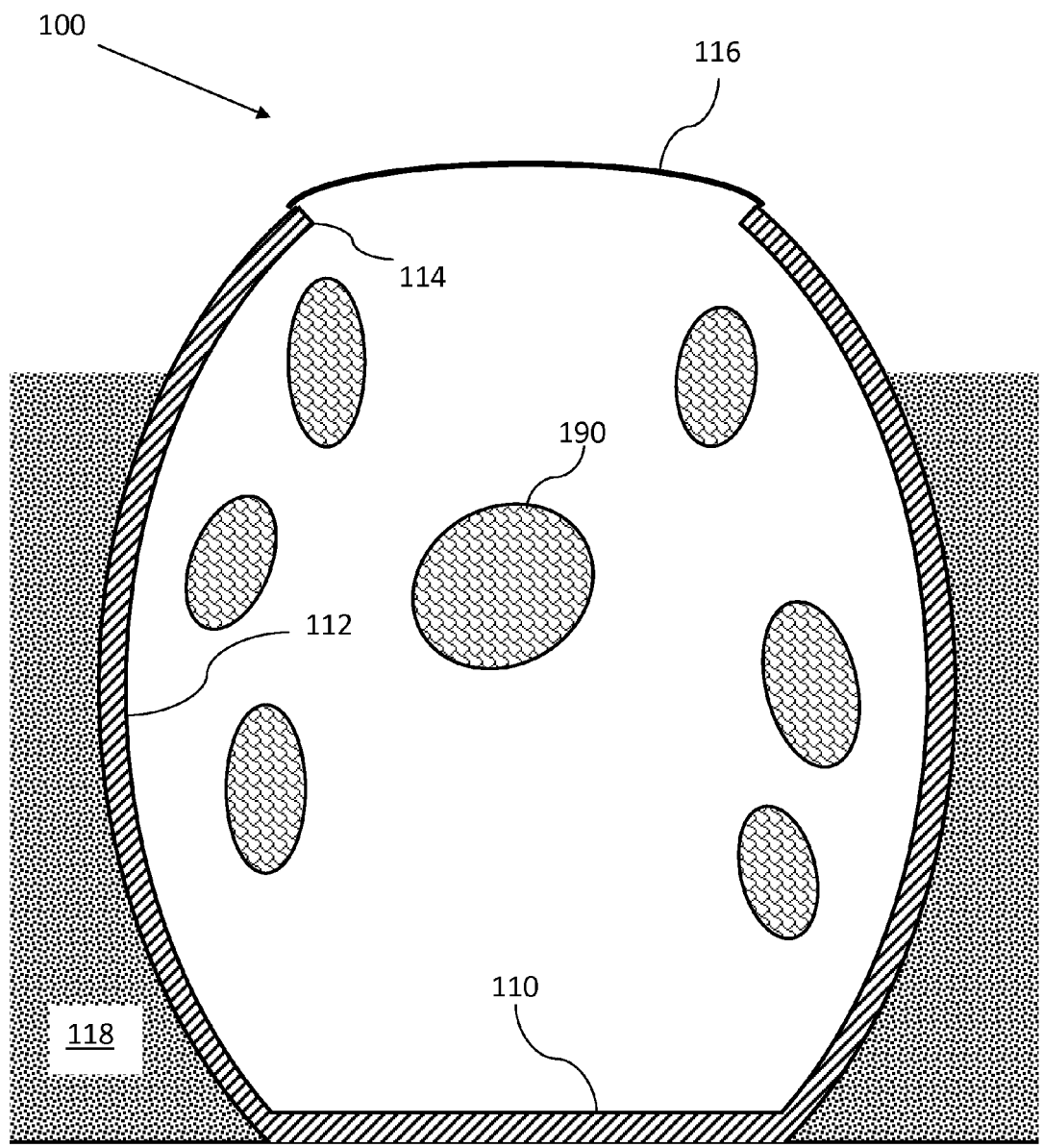
FIG. 2 is a vertical cross-section of the oven of the present invention—without the tray system—configured for baking flatbreads on its interior sidewall.

FIG. 2 shows a vertical cross-section of the oven 100, which includes an urn-shaped interior sidewall 112, bottom 110 and a top opening 114. The oven 100 is generally round in a horizontal cross-section and generally oval in a vertical cross-section. The largest diameter of the oven in its mid-portion may range from about 2 feet to about 8 feet. The height of the oven may range from about 2 feet to about 10 feet. The top opening 114 is generally smaller in diameter than the mid-portion of the wall 112. In embodiments, the diameter of the top opening 114 may range from about ¼ to about ¾ of the largest diameter of the interior sidewall 112 in its mid-portion. The curved shape of the oven is important for reflections of the radiant heat wave so as to assure that the flatbread dough 190 is heated evenly on both sides, the one attached to the interior sidewall 112 and the opposite side exposed to the interior volume of the oven 100.

The oven 100 may be positioned at least partially in the earth, sand, or brick surrounding 118 so as to retain the heat from the heating source, which is generally placed on the bottom 110 (not shown) such as charcoal, burning wood, gas, or electrical heating elements.

A simple cover 116 sized to close the top opening 114 may be provided to preclude the escape of the heat from the oven 100 when in use.

The oven 100 of the invention may be used in this configuration for baking flatbreads 190 on the interior sidewall 112 thereof as described above and as has been traditionally done for hundreds of years. After heating up the oven interior, unbaked dough pieces may be flattened and attached to the sidewall 112 throughout the interior volume of the oven 100. Baked flatbreads may be manually removed and replaced with fresh flattened dough pieces for a continuous production process of baking flatbreads.

For purposes of a commercial bakery, it is preferred to use a single piece of equipment for multiple purposes. In this case, it is desirable to use the oven not only for baking flatbreads on its sidewall, but also for baking regular bread products. To accomplish this goal, the present invention provides for a tray system, which may be configured to be built with the oven in the first place as a combination product. Alternatively, the tray system may be configured as a kit to convert an existing oven for a dual-purpose use.

Figure 3:
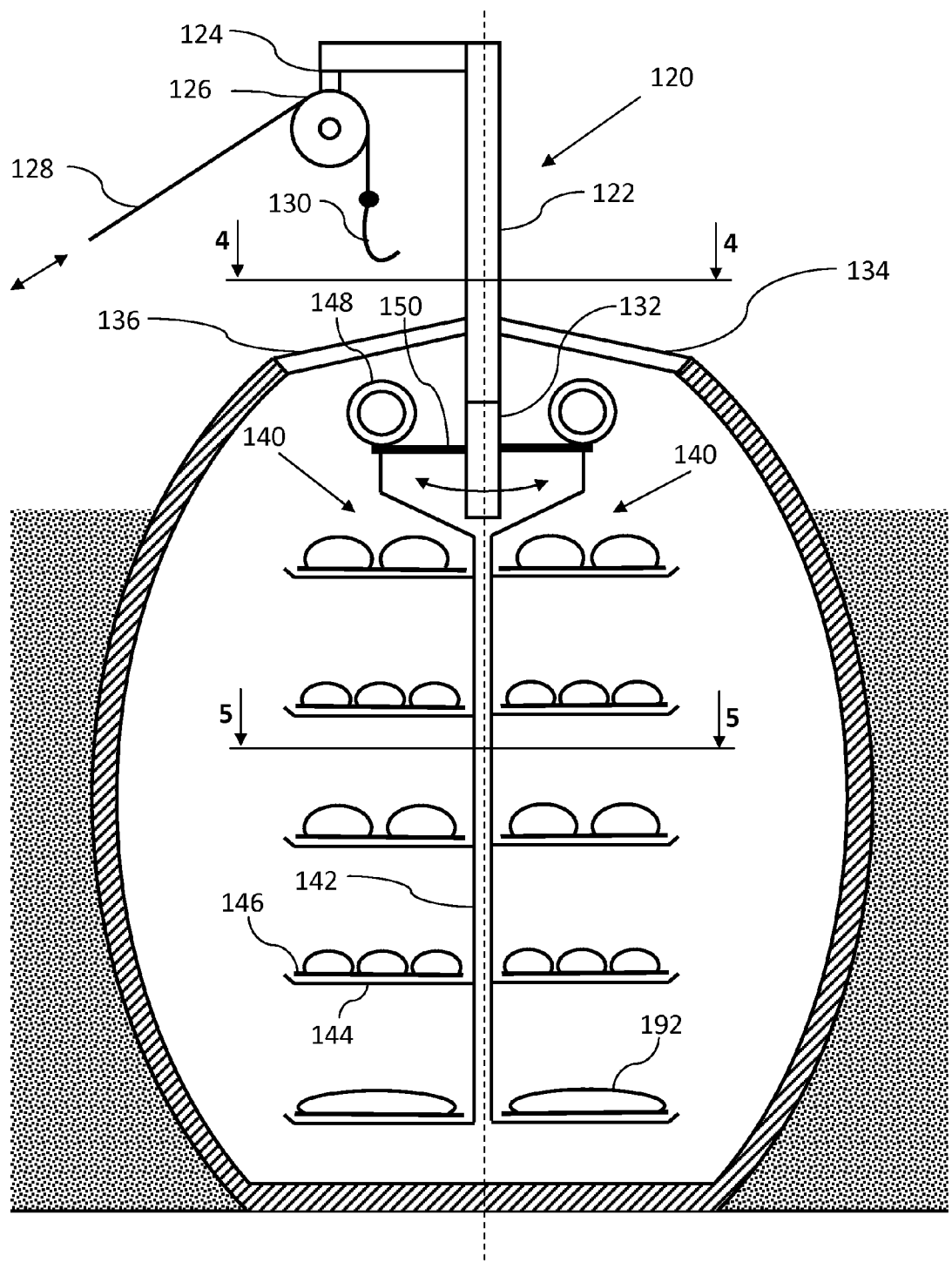
FIG. 3 is vertical cross-section of the oven with the tray system installed therein—configured for baking conventional bread products, according to the first embodiment of the invention.

FIG. 3 shows a first embodiment of the generally circular tray system inserted in the urn-shaped clay oven 100. The tray system generally includes a plurality of frame segments 140 rotatably supported on the supporting mechanism 120, which in turn is resting on the removable oven cover 134.

Figure 5:
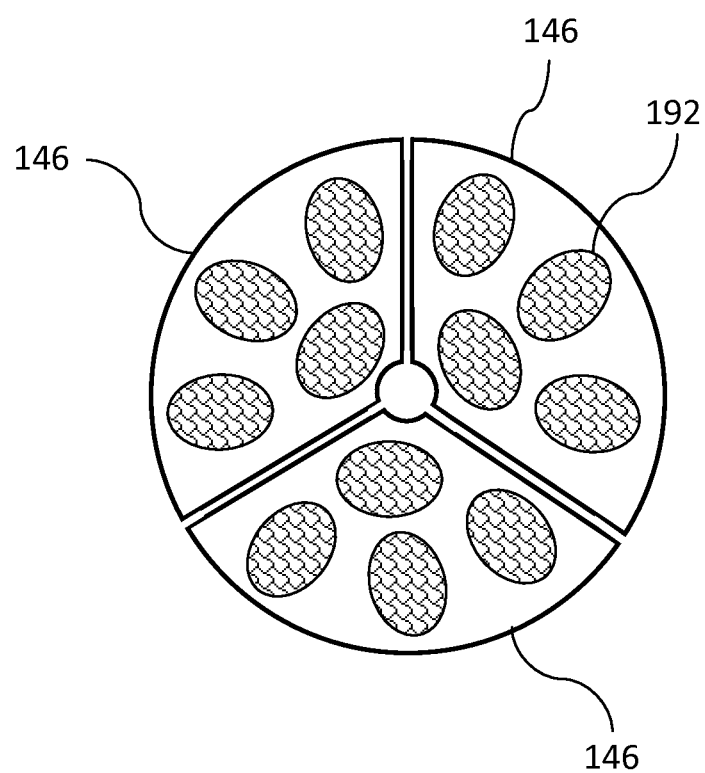
FIG. 5 is the top view of the tray system along the line 5-5 in FIG. 3, the oven is not shown.

The general shape of the tray system when assembled may be circular in a horizontal cross-section, as evidenced from FIG. 5. It includes a number of frame segments 140 extending from the common vertical axis (shown in FIG. 3 as a dashed line), which in this case coincides with the central vertical axis of the oven 100. When all frame segments are put together, they form a circular outline of the tray system. If two frame segments are used, each frame segment would cover about 180 degree span, or one half of the circle. If three frame segments are used (such as in one preferred embodiment), each segment would cover about 120 degree span around the common vertical axis. In case of using four frame segments, each frame segment would cover about ¼ of the circle, e.g. 90 degree span.

Each frame segment 140 may be configured to include a vertical strut 142 with extending wire arms 144 designed to support one or more baking trays 146 with bread product 192 placed thereon. In embodiments, 2-6 baking trays 146 may be used in each frame segment 140. The baking trays 146 may be stacked up vertically and spaced apart to allow sufficient room for the bread products 192. The baking trays 146 may also be configured to be removable from the frame segment 140 so as to facilitate quick exchange of one baking tray with ready bread products for another baking tray containing unbaked dough.

Each frame segment 140 may include a ring 148 positioned at the top of the frame segment 140 and generally on a vertical line going through its center of gravity (including bread products positioned thereon). In this case, lowering and lifting each frame segment 140 in and out of the oven 100 may be accomplished by holding the frame segment using the ring 148—without much tilting of the frame segment 140. The ring 148 may also be used to support the entire frame segment 140 by the supporting mechanism 120—using a retrievable arm 150, for example, or by other suitable means.

Supporting mechanism 120 is also provided as part of the tray system and may be designed to rotatably support the frame segments 140 while inside the oven 100. To accomplish this, a vertical stem 122 may be provided with a rotatable lower portion 132. Rotation of the lower portion 132 may accomplish turning of the frame segments 140 and baking trays 146 around the oven 100.

The stem 122 may be attached to the oven cover 134, which in turned may be sized and configured to rest over the top opening 114 of the oven 100. The oven cover 134 may be removably positioned over the oven 100 with the entire supporting mechanism 120 and the frame segments 140 located inside the oven 100.

Figure 4:
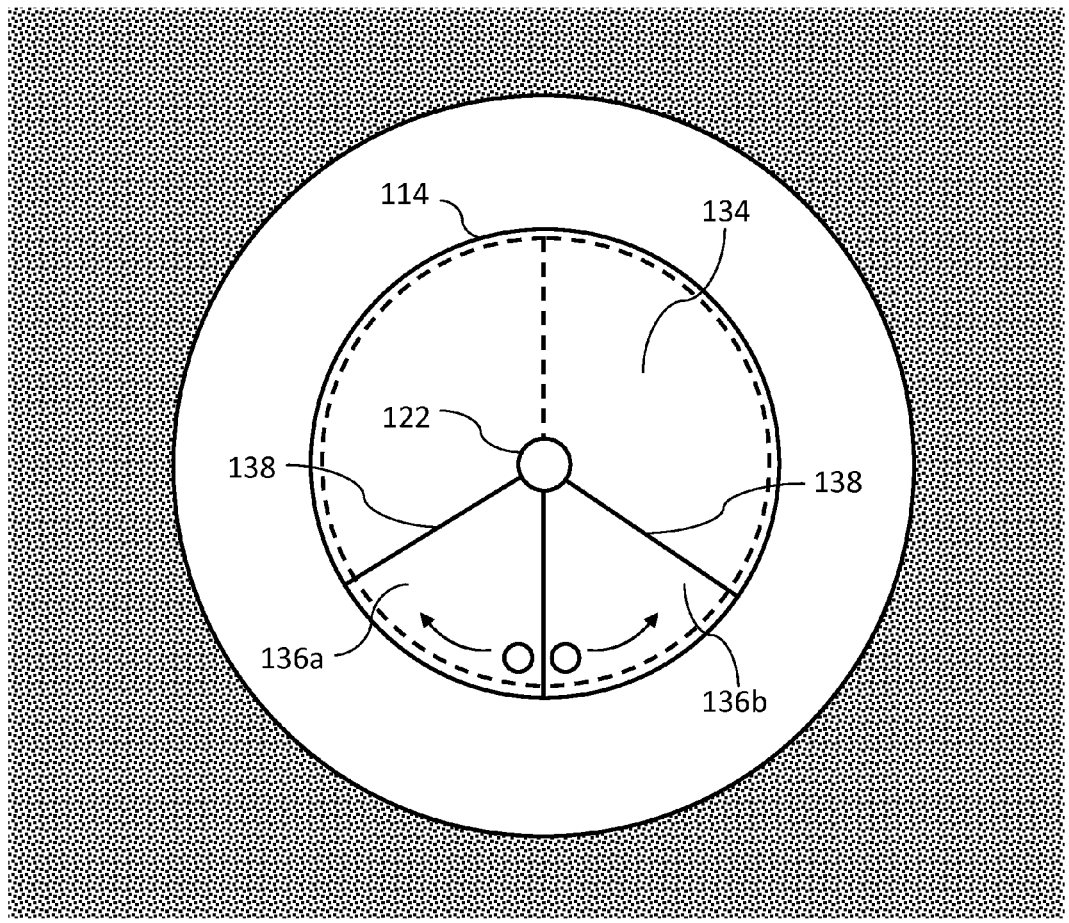
FIG. 4 is a top view of the oven with the tray system along the line 4-4 in FIG. 3.

The oven cover 134 is generally round as it corresponds to the top oven opening 114. The oven cover 134 may include a hinged or sliding door 136, for example configured to have two halves 136a and 136b—as seen in FIG. 4. Each half 136a and 136b may be attached to the rest of the oven cover 134 by hinges 138 so as to allow opening of the door 136. Note that even when fully open, the door 136 allows only partial access to the interior volume of the oven—in the case of three frame segments illustrated in FIG. 4, the door 136 is sized to allow only one frame segment 140 to be raised from the oven 100. In other embodiments, the size and shape of the door generally corresponds to the size and shape of one frame segment. The tray system with three frame segments is shown in FIG. 4 using dashed lines. Shaping the door 136 in this manner allows retrieval of one frame segment 140 while the others are inside the oven 100—so that the baking process is not compromised due to leakage of heat through an excessive top opening.

The supporting mechanism 120 may further include a portion extending up from the oven cover 134. It may include a pulley system to facilitate retrieval of the frame segment 140 from the oven 100. The pulley system may include a frame 124 supporting a rotatable roller 126 and a thread 128 with a hook 130 positioned above the ring 148 of the frame segment 140. The height of the pulley system should be sufficient to expose enough of the frame segment to afford full access thereto by the operator.

Once the tray system is assembled in the oven 100, it can be used in the following way to bake conventional bread products. First, after reaching the desired baking temperature, one frame segment 140 is loaded into the oven 100 containing the unbaked dough positioned on the trays 146. The tray system may then be turned by ⅓ of the revolution and the second frame segment may be placed inside the oven, the tray system may then be turned again by ⅓ of one revolution about its common vertical axis and the third frame segment may be placed inside the oven. The door 136 may then be closed and the bread products may be left in the oven for conventional baking.

Figure 6:
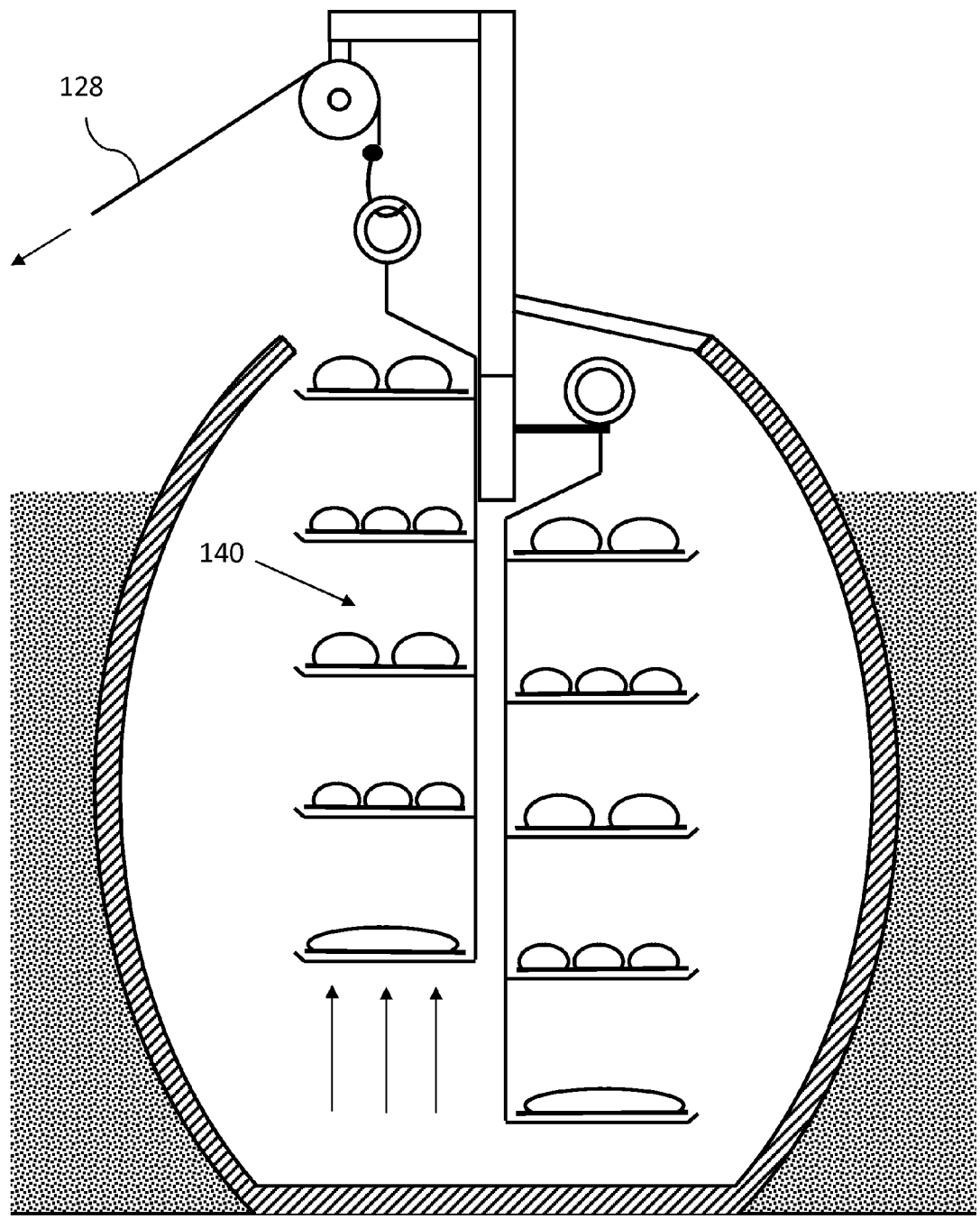
FIG. 6 shows the process of raising one of the frame segments out of the oven.

After expiration of the desired bake time, the door 136 may be open and the tray system may be turned to the first frame segment placed inside the oven. This frame segment may be raised (see FIG. 6), for example with the help of the pulley system such that all baking trays 146 become accessible to the operator. The operator may replace baking trays from the oven containing ready bread products with new baking trays containing unbaked dough. The frame segment may then be lowered back into the oven and the tray system may be turned to expose the next frame segment.

Periodic turning of the tray system and replacement of the baking trays allows continuous production of the conventional bread products using the oven 100 of the invention.

Turning of the tray system may be done manually or with the help of a motorized assembly (not shown). In case of using a motor, provisions may be made to assure accurate positioning of the tray system such that door opening corresponds with the respective frame segment.

When baking of the conventional bread products is finished, the tray system may be removed from the oven converting it back to the ability to bake flatbreads on the inner sidewall thereof.

DETAILED DESCRIPTION OF THE SECOND PREFERRED EMBODIMENT OF THE INVENTION

The first embodiment of the present invention described above works well with the ovens in which the top opening is not appreciably smaller than the diameter of the oven in its mid-portion. However, if the top opening is indeed much smaller than the main portion of the oven, constructing the tray system using the principles described above may have a significant limitation, namely that the tray system has to match the size of the top opening and therefore may be appreciably smaller than the available interior volume of the oven.

Figure 7:
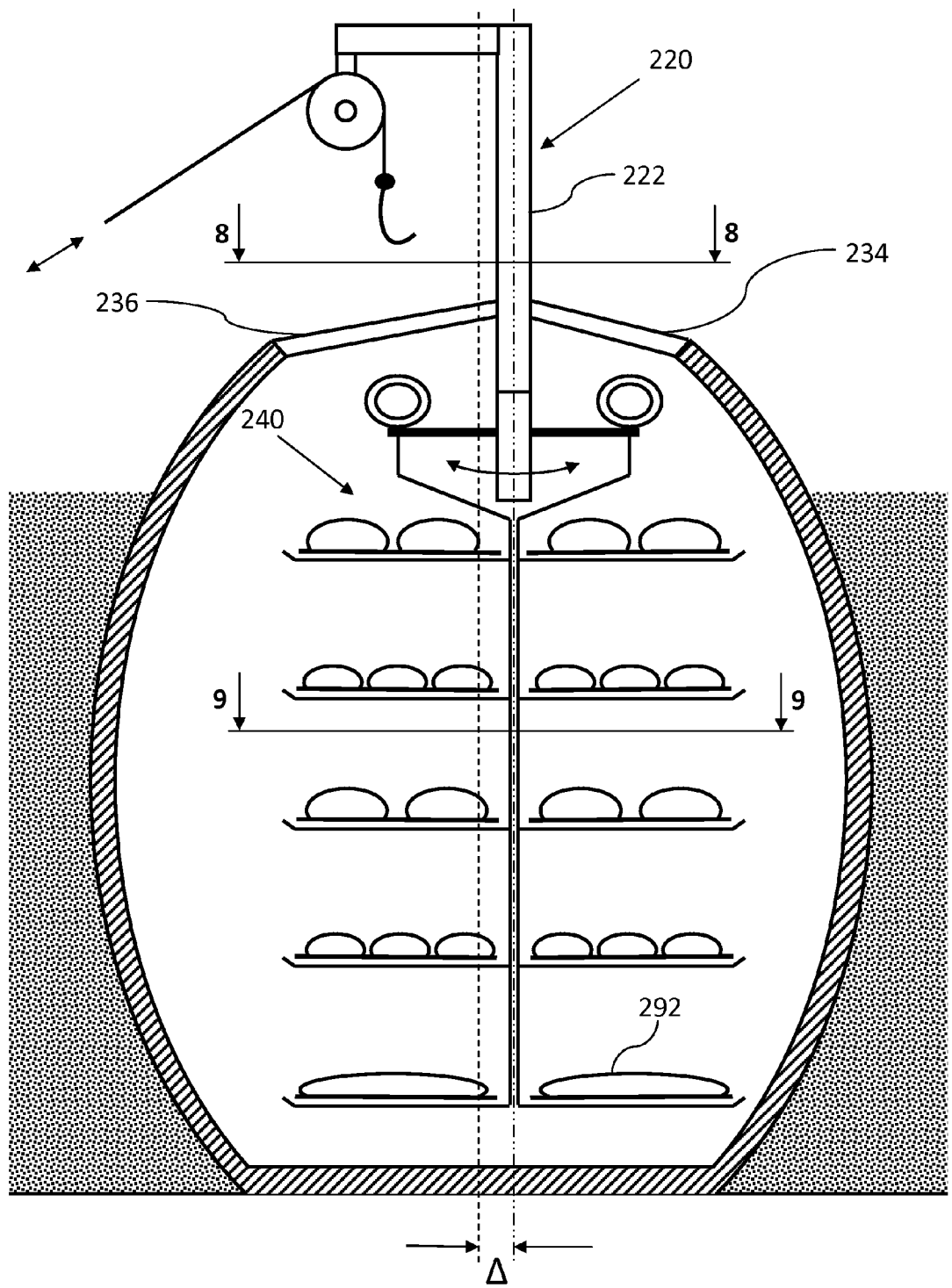
FIG. 7 is vertical cross-section of the oven with the tray system installed therein—configured for baking conventional bread products, according to the second embodiment of the invention.

To compensate for this potential mismatch, the second embodiment of the tray system is provided in which the common vertical axis of the tray system is placed in parallel with the vertical axis of the oven but at a certain offset—see FIG. 7. Shown in this figure is the central oven axis in a dashed line and a parallel common vertical axis of the tray system using a dotted-and-dashed line. The offset Δ is clearly marked.

Figure 8:
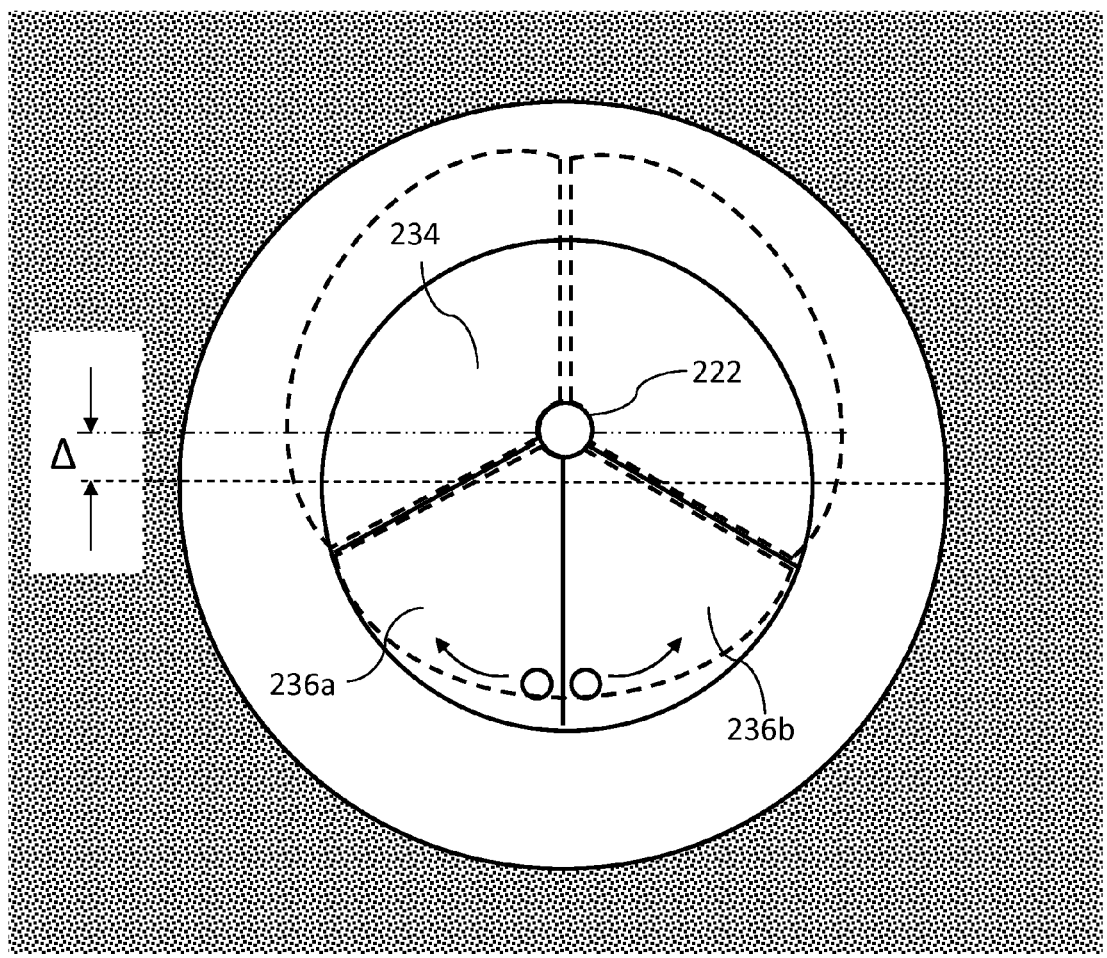
FIG. 8 is a top view of the oven with the tray system along the line 8-8 in FIG. 7.

Using this offset, it is now possible to enlarge the size of the tray system 240 and make it bigger than the top opening of the oven. FIG. 8 shows a top view of the oven along the line 8-8 in FIG. 7. The same offset Δ is seen. The oven cover 234 is shown to include a stem 222 of the supporting mechanism located above the center of the oven. The door 236 is sized to allow a passage of one frame segment 240 therethrough.

Figure 9:
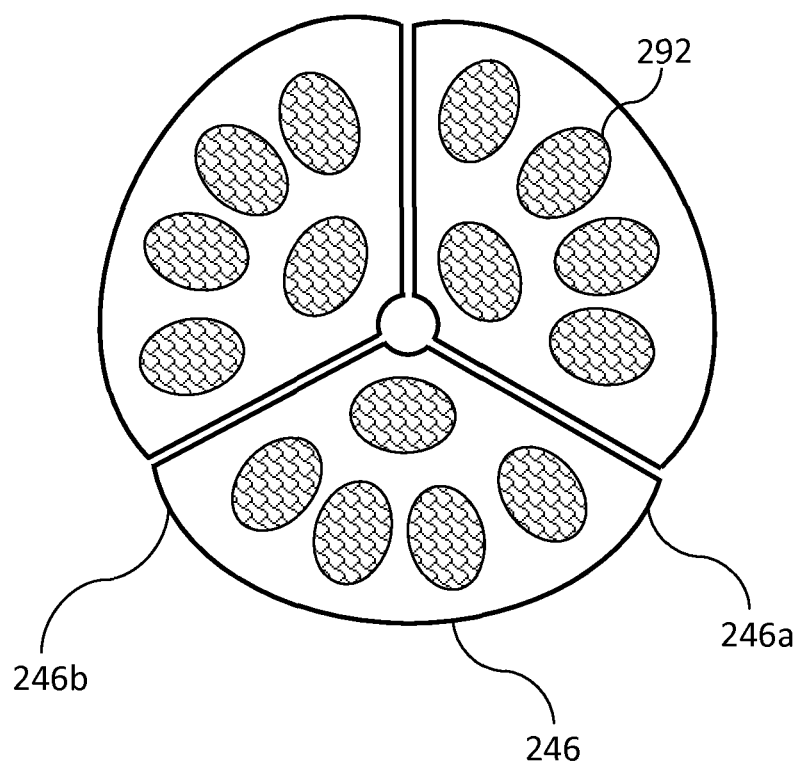
FIG. 9 is the top view of the tray system along the line 9-9 in FIG. 7, the oven is not shown.

FIG. 9 shows a top view of the tray system. Of note is that each baking tray 246 is shaped with reduced corners 246a and 246b so as to fit through the door opening 236 in the oven cover 234. Enlarging the baking trays allows positioning of greater number of bread products at a time. In the example illustrated in FIG. 9, each baking tray may hold 5 pieces of bread vs. 4 pieces of bread in the baking tray 146 shown in FIG. 5.

The use of the oven and the tray system is similar to that described above for the first embodiment of the invention, except that due to the offset between the oven and the tray system, the baking trays may be made larger and hold greater number of bred products.

Figure 10:
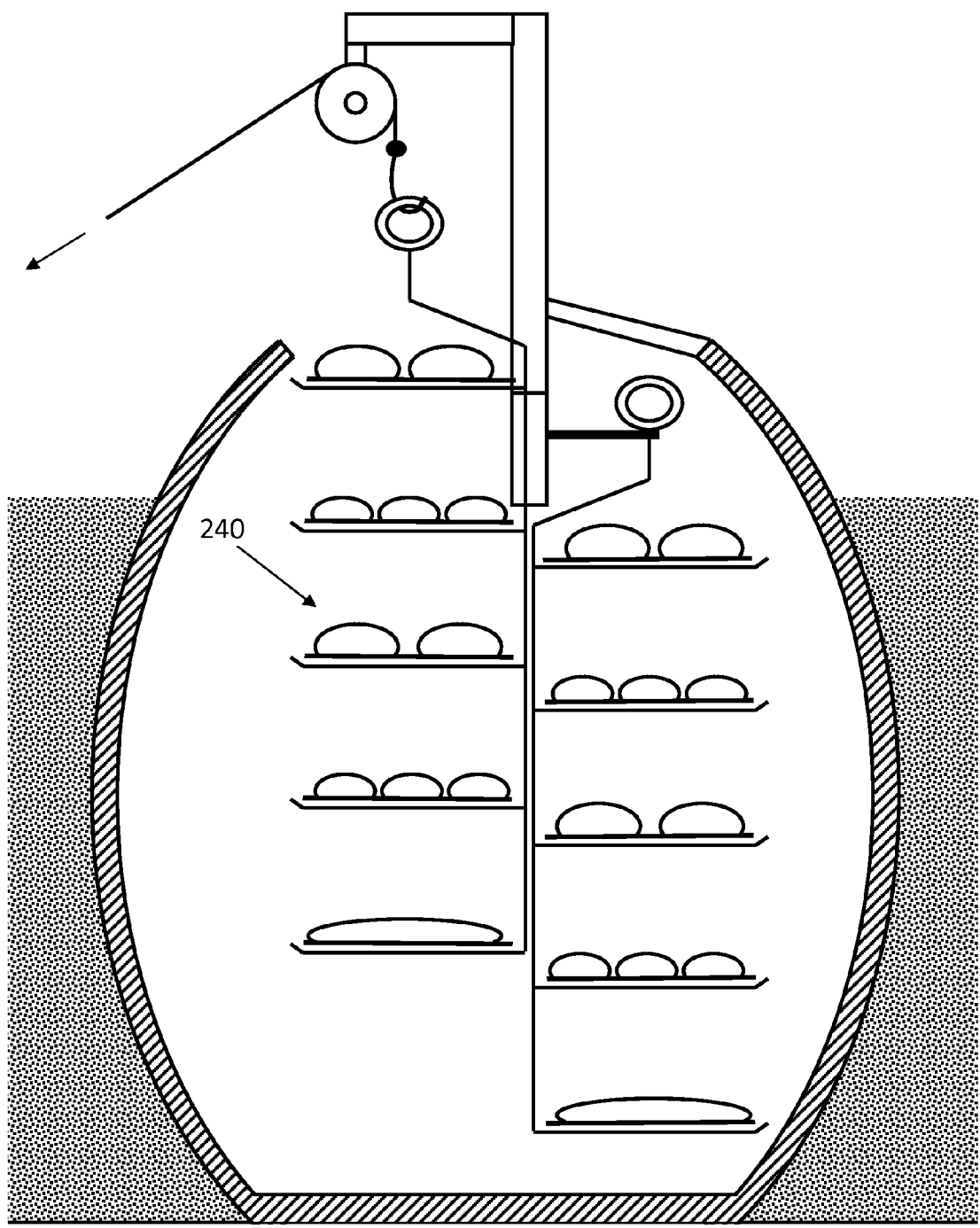
FIG. 10 shows the process of raising one of the frame segments out of the oven.

FIG. 10 shows a process of replacement of baking trays in the frame segment 240 which is raised through the opening of the door 236 by the pulley mechanism or by hand.

In embodiments, the lower baking trays may be made smaller than the rest of the baking trays if the curvature of the oven precludes using full size baking trays.

The tray system of the first or the second embodiment of the present invention may be positioned on the oven in as little as 15-20 min making switching the baking from flatbread to the conventional bread products easy and fast. Dismantling the tray system also does not take a long time and may be accomplished in 15-20 min by removing the oven cover and detaching the frame segments therefrom.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Although the invention herein has been described with respect to particular embodiments, it is understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A dual-purpose bread making oven comprising:
an urn-shaped oven with an interior sidewall and a round top opening sized smaller than a mid-portion of said oven, said oven having a generally oval-shaped vertical cross-section, said interior sidewall is configured for baking flatbread thereon, and
a removable and rotatable circular tray system configured for baking conventional bread products in said oven, said tray system having a common vertical axis and comprising:
a plurality of individually removable frame segments, said frame segments generally forming a circle when positioned around said common vertical axis, each of said frame segments supporting a plurality of vertically stacked and vertically spaced apart baking trays, each baking tray is removable from the frame segment and shaped to correspond to the shape of the frame segment,
a removable oven cover configured to close off said round top opening of said oven, said oven cover including a door sized for removal of one of said frame segments at a time, and
a supporting mechanism attached to said removable oven cover and extending at least partially into said oven, said supporting mechanism configured to rotatably support said plurality of frame segments suspended therefrom, whereby each of said frame segments is rotatable while suspended on said supporting mechanism about said common vertical axis, each of said frame segments is individually removable through said door,
whereby said oven is configured to bake conventional bread products placed on said baking trays when said circular tray system is present inside said oven; said oven is configured for baking flatbreads on the interior sidewall thereof when said circular tray system is removed therefrom.

2. The oven as in claim 1, wherein said circular tray system including three frame segments symmetrically positioned about said common vertical axis, each of said frame segments supporting said baking trays having side edges radially extending at an angle of about 120 degrees from said common vertical axis.

3. The oven as in claim 1, wherein said supporting mechanism extending vertically away from said oven and including a pulley system configured to lift and remove said individual frame segments from said oven.

4. The oven as in claim 3, wherein said frame segments include a ring positioned above thereof, said pulley system including a hook vertically aligned with said ring, said pulley system is further configured to engage said hook with said ring to allow removal of each frame segment from said oven.

5. The oven as in claim 1 defining an oven vertical axis, said circular tray system positioned with an offset between said oven vertical axis and said common vertical axis.

6. The oven as in claim 5, wherein a diameter of all frame segments forming together said circular tray system is equal to or greater than a diameter of the round top opening of said oven but less than a maximum diameter of said oven at said mid-portion thereof, said frame segments are sized individually to be less than said round top opening to allow removal of one frame segment at a time through said round top opening.

7. The oven as in claim 6, wherein said baking trays have a shape of a one-third segment of a circle corresponding to the diameter of said circular tray system.

8. A dual-purpose bread making oven comprising:
a vertically symmetrical urn-shaped oven defining an oven vertical axis, said oven having an interior sidewall and a round top opening, said oven having a generally oval-shaped vertical cross-section, said interior sidewall is configured for baking flatbread thereon, and
a removable and rotatable circular tray system with a common vertical axis parallel to said oven vertical axis and spaced apart therefrom with a predefined offset, said circular tray system comprising:
a plurality of frame segments generally forming a circle when positioned around said common vertical axis, each of said frame segments supporting a plurality of vertically spaced apart baking trays,
a removable oven cover configured to close off said round top opening of said oven, said oven cover including a door sized larger than one of said frame segments but smaller than said circle, and
a supporting mechanism suspended from said removable oven cover and extending into said oven, said supporting mechanism configured to rotatably support said plurality of frame segments about said common vertical axis, wherein each of said frame segments is individually removable one at a time through said door once turned about said common vertical axis and positioned below said door, whereby said oven is configured to bake conventional bread products placed on said baking trays when said circular tray system is present inside said oven; said oven is configured for baking flatbreads on the interior sidewall thereof when said circular tray system is removed therefrom.

\* \* \* \* \*